US012744397B2

(12) United States Patent
Kajjam et al.

(10) Patent No.: US 12,744,397 B2
(45) Date of Patent: Sep. 22, 2026

(54) INTRINSICALLY SAFE ENERGY HARVESTER FOR POWERING MULTI-SENSOR

(71) Applicant: Honeywell International Inc., Charlotte, NC (US)

(72) Inventors: Praveen Kumar Kajjam, Hyderabad (IN); Murali Krishna Bezawada, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 249 days.

(21) Appl. No.: 18/593,901

(22) Filed: Mar. 2, 2024

(65) Prior Publication Data

US 2025/0266694 A1 Aug. 21, 2025

(30) Foreign Application Priority Data

Feb. 19, 2024 (IN) ............................ 202411011499

(51) Int. Cl.
*H02J 7/64* (2026.01)
*H02J 7/61* (2026.01)
*H02J 7/34* (2006.01)

(52) U.S. Cl.
CPC .................. *H02J 7/64* (2026.01); *H02J 7/61* (2026.01); *H02J 7/345* (2013.01)

(58) Field of Classification Search
CPC ..... H02J 7/00302; H02J 7/00308; H02J 7/345
USPC ........................................................... 361/56
See application file for complete search history.

(56) References Cited

U.S. PATENT DOCUMENTS 4,586,104 A 4/1986 Standler
6,882,514 B2 4/2005 Mutunga et al.
7,369,379 B2 5/2008 Marr
9,103,920 B2 8/2015 Valtentino et al.
11,114,432 B2 9/2021 Hua et al.
11,791,748 B2 10/2023 Griswold et al.
2002/0109952 A1* 8/2002 Rapsinski .............. H02H 9/042 361/91.1
2014/0071566 A1 3/2014 Parthasarathiy et al.
2021/0104886 A1* 4/2021 Lee ...................... H02H 11/006

OTHER PUBLICATIONS

"Honeywell VersatilisTM Signal ScoutTM Release 100, Installation and User's Guide", 34-VT-25-02, Feb. 2023, Honeywell International Sarl.

(Continued)

*Primary Examiner* — Kevin J Comber
(74) *Attorney, Agent, or Firm* — Ingrassia Fisher & Lorenz

(57) ABSTRACT

An electrical circuit for protecting an electronic device, and a method of operating the electric circuit, can involves the use of a protection circuit that includes a group of diodes and one or more field effect transistors, along with an energy storage device associated with the electronic device. The field effect transistors are electrically connected to the group of diodes, and reference voltage associated with the protection circuit is tunable to trigger the protection circuit at a threshold voltage, which when triggered activates the field effect transistor(s) to protect the energy storage device from an over voltage condition or an over charging condition until the over voltage condition or the overcharging condition is no longer present.

4 Claims, 15 Drawing Sheets

(56) References Cited

OTHER PUBLICATIONS

"Honeywell Versatilis for Condition Based Monitoring, Maximize Uptime, Reliability, and Efficiency", 2022, Honeywell International Inc.
"Honeywell Versatilis Transmitter, Multi-Variant Sensing", Honeywell International Inc., Jun. 2023.

* cited by examiner

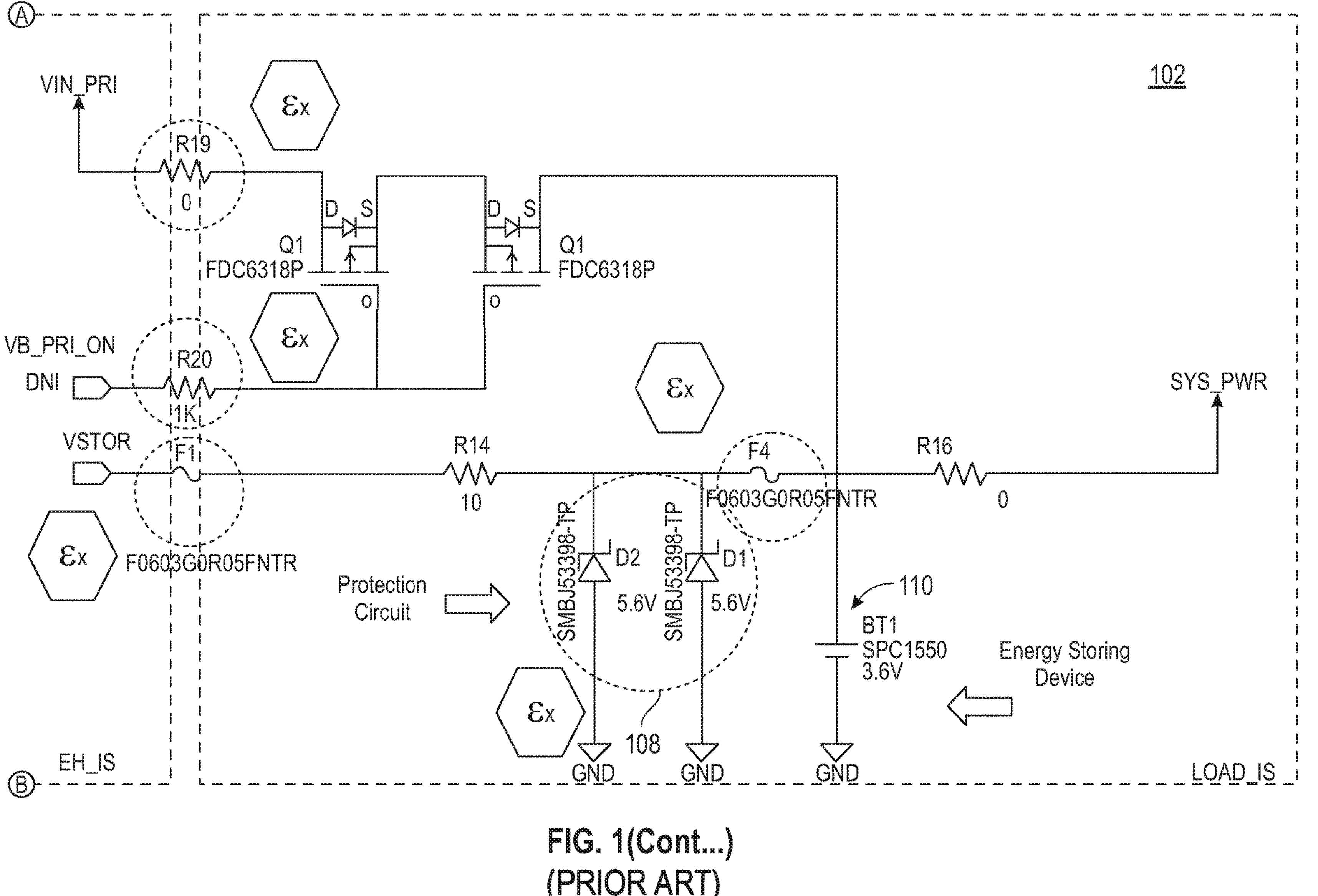
FIG. 1(Cont...)
(PRIOR ART)

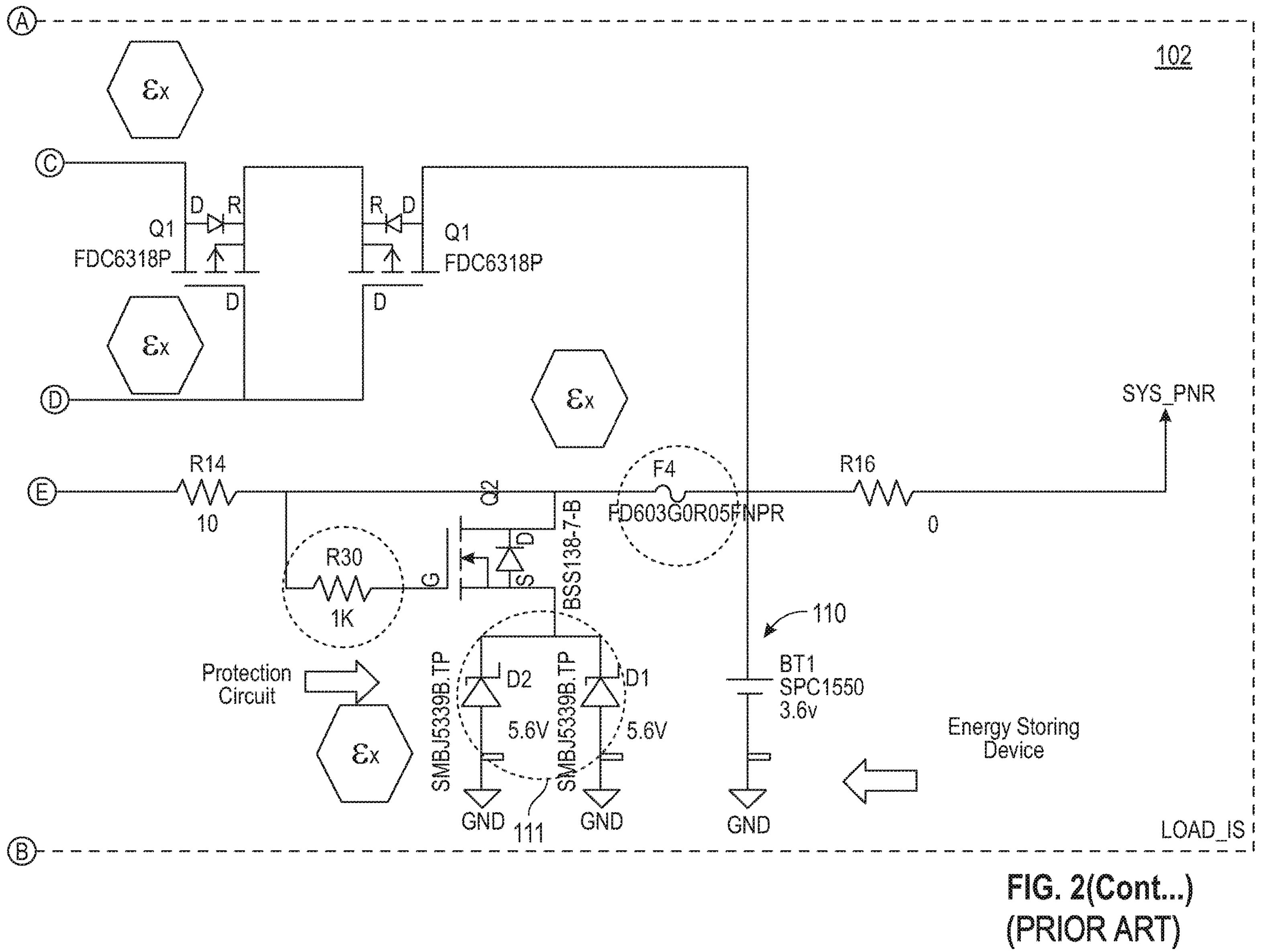
FIG. 2(Cont...)
(PRIOR ART)

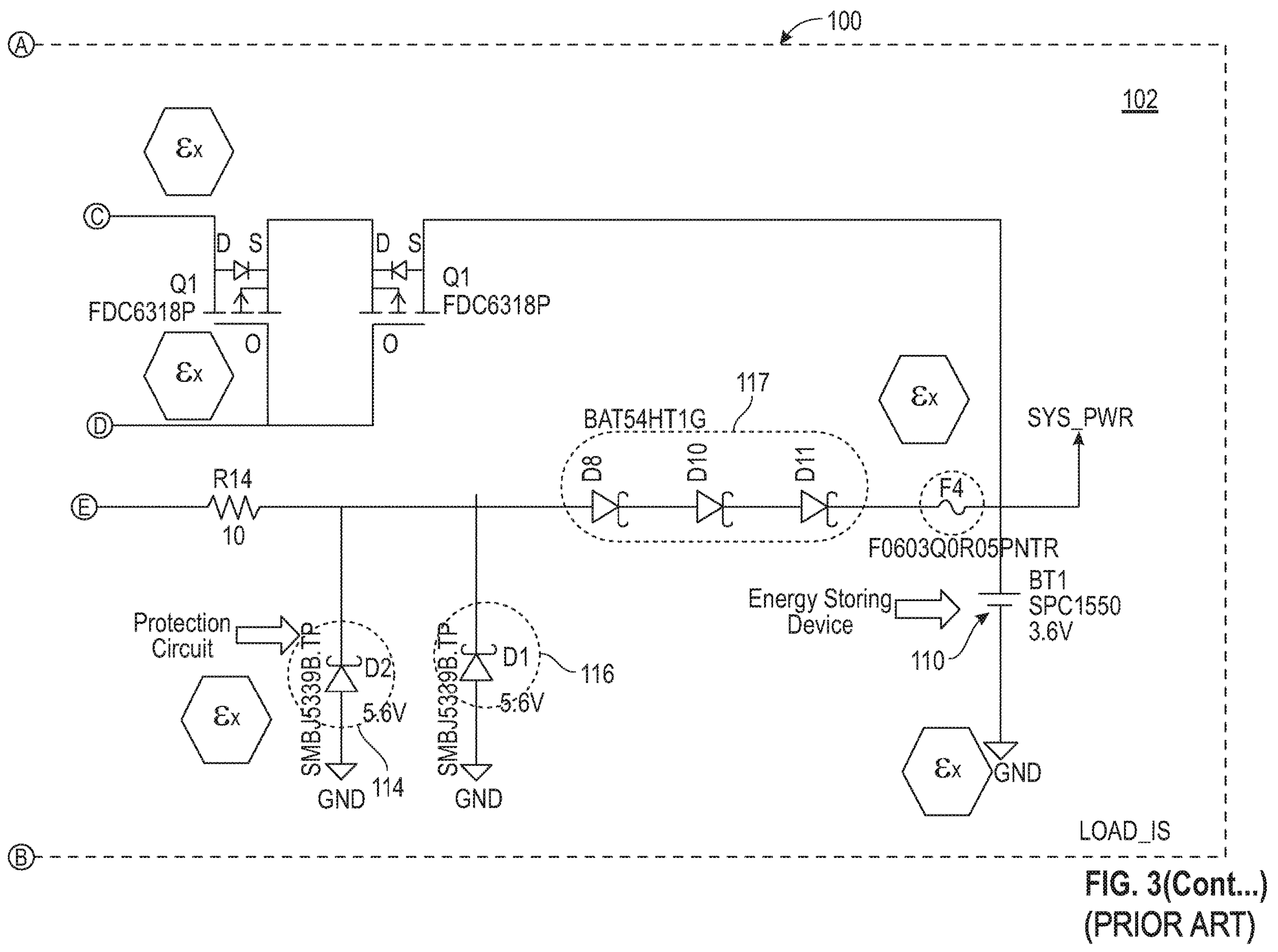
FIG. 3(Cont...)
(PRIOR ART)

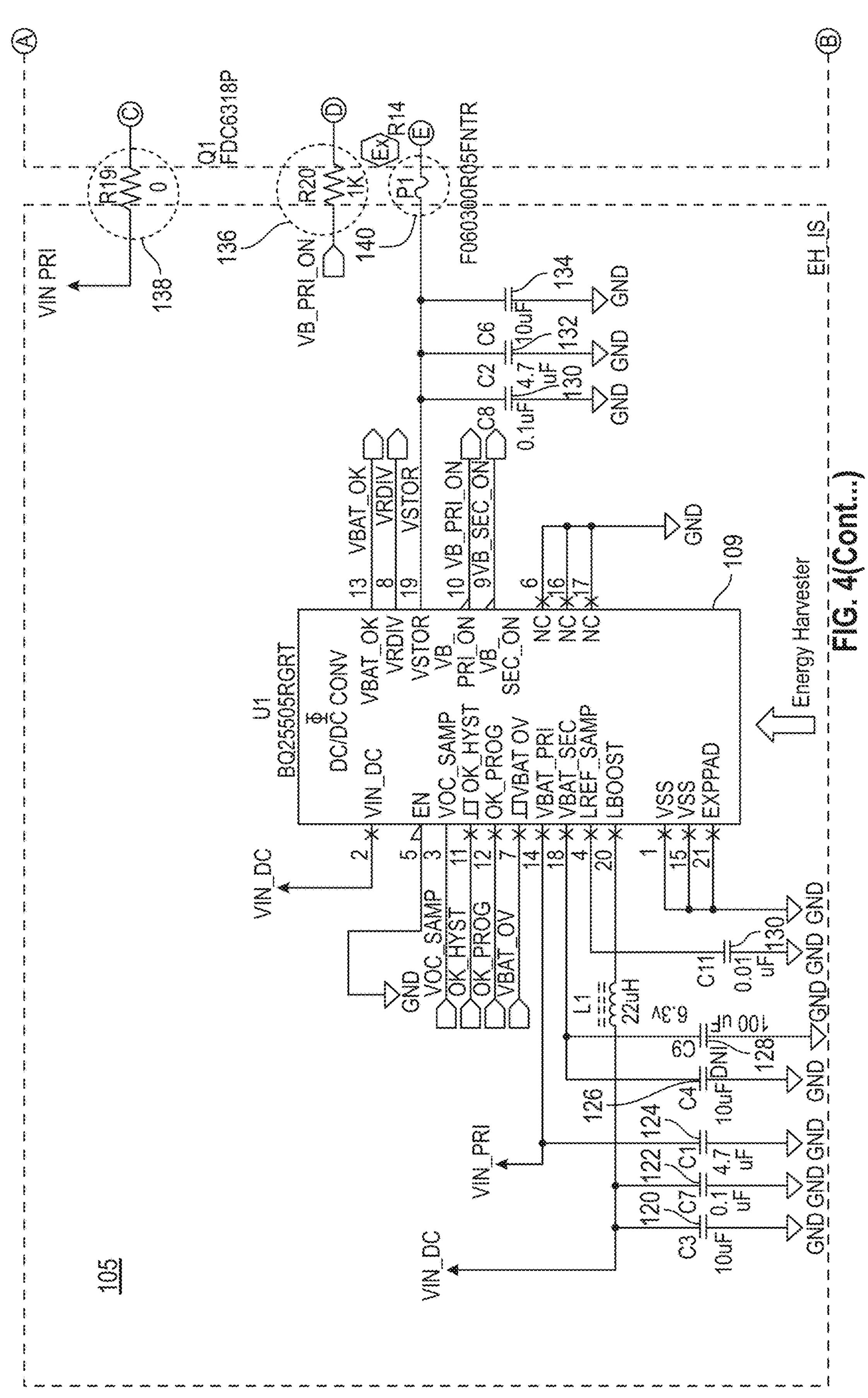
FIG. 4(Cont...)

INTRINSICALLY SAFE ENERGY HARVESTER FOR POWERING MULTI-SENSOR

CROSS-REFERENCE TO RELATED PATENT APPLICATION

This patent application claim priority to Indian Provisional Patent Application No. 202411011499, filed Feb. 19, 2024, which is incorporated herein by reference in its entirety.

TECHNICAL FIELD

Embodiments are generally related to the field of energy harvesting devices. Embodiments further relate to intrinsically safe energy harvesters for use with power multi-sensor applications.

BACKGROUND

Photovoltaic-based energy harvesting, also known as solar energy harvesting, is a sustainable and increasingly popular method for generating electrical energy from sunlight. This technology can convert sunlight into electrical energy using photovoltaic cells or solar panels. Photovoltaic energy harvesting plays a crucial role in reducing our dependence on fossil fuels and mitigating climate change. Solar panels include numerous photovoltaic cells configured from semiconductor materials such as silicon. When sunlight strikes these cells, it excites electrons, creating an electric current.

To make use of the direct current (DC) generated by solar panels, the current needs to be boosted and stored for downstream use. This is where an energy harvester module can come into play. An energy harvester module can be utilized as a part of an energy harvesting device or energy harvesting system to efficiently extract power ranging from microwatts (μW) to milliwatts (mW) from various DC energy harvesting sources, such as photovoltaic (solar), without destabilizing those sources. The energy harvester module can also include battery management features to prevent overcharging of secondary rechargeable batteries and ensure that the voltage is boosted without exceeding safe limits or depleted excessively by the system load.

A challenge arises in storing this extracted energy from the energy harvester module. The extracted energy needs to be preserved in energy storage devices such as rechargeable batteries, supercapacitors, hybrid layer capacitors, etc. Typically, these energy storage devices can operate in a voltage range of 3V to 4.4V. Users can select the appropriate voltage source based on the output voltage of the energy harvester module for general-purpose applications.

In hazardous area applications, the boosted output voltage needs to be protected to match the voltage rating of the energy storing source. Various protection techniques exist in electrical circuits to prevent overcharging of the energy storing source. However, each method has its pros and cons. Some meet the overvoltage protection requirement, while others meet functional performance requirements, but not both.

In hazardous location (HAZLOC) applications, protection methods vary based on the deployment location. In North America, they are classified into Class I Division 1 and Class I Division 2, with Class I Division 1 being more stringent. Similarly, in EMEA (Europe, Middle East, Africa) regions, they are classified into Zones like Zone 0, Zone 1, and Zone 2, with Zone 0 being the most stringent. Depending on the classes and zones, the protection circuits may incur up to two countable faults and unlimited uncountable faults. This can lead to duplicates and triplicates of protection circuits, which come with limitations such as, for example, increased circuit leakage currents, potentially leading to draining of energy storage devices.

FIG. 1, FIG. 2, and FIG. 3 illustrate schematic diagrams of different prior art protection circuits, which can be used with energy harvesting systems. The configurations shown in FIG. 1 to FIG. 3 are depicted herein to demonstrate problems with current protection circuit solutions. Note that in FIGS. 1-3, similar or identical components may be indicated by identical reference numerals.

FIG. 1 illustrates a schematic diagram of an electrical circuit 100 that includes an energy harvesting circuit 104 that is connected electrically to a prior art shunt protection circuit 102. The energy harvesting circuit 104 includes an energy harvester 106 and the prior art shunt protection circuit 102 includes a duplet of Zener diodes 108 as part of the prior art shunt protection circuit 102 and in association with an energy storing device that includes a capacitor 110.

The prior art shunt protection circuit 102 shown in FIG. 1 meets functional requirement with very low reverse leakage current in the order of 5 μA. However, the duplet of Zener diodes 108 does not comply with a maximum super capacitor voltage of 4.1 V. Lowering the Zener voltage to 4.1V can enable compliance with the super capacitor voltage rating, but this can result in a very large reverse leakage current up to 20 mA/Zener which will drain the battery and thus does not meet functional requirements. In addition, there are no energy storage devices available with a miniature form-factor with such high voltage, for example, 5.6V.

The Zener diodes 108, while functioning as important components for the prior art shunt protection circuit 102, fail to adhere to the maximum super capacitor voltage of 4.1 V. Although reducing the Zener voltage to 4.1V would align with the super capacitor voltage rating, this adjustment leads to a substantial increase in reverse leakage current, reaching up to 20 mA/Zener. Consequently, this heightened leakage current poses a severe threat, as it could rapidly deplete the battery, rendering it non-compliant with functional requirements. Additionally, integrating energy storage devices within the context of a miniature battery rated at, for instance, 5.6V, has not been addressed in this setup.

FIG. 2 illustrates a schematic diagram of the electrical circuit 100 including the energy harvesting circuit 104 and the prior art shunt protection circuit 102. The configuration shown in FIG. 2 is slightly different from that shown in FIG. 1. That is, the prior art shunt protection circuit 102 depicted in FIG. 2 uses a duplet of Zener diodes 11 in association with an N-channel metal-oxide semiconductor field-effect transistor (MOSFET) switch 113. The Zener voltage associated with the prior art shunt protection circuit 102 is 4.1V, with the N-channel MOSFET switch 113 having a gate threshold set to nominal 3.9V in a series arrangement, and which complies with the super cap voltage rating but with a lower reverse leakage current. N-Channel MOSFET gate thresholds generally can begin at 1V with a worst-case maximum voltage of 2.8V, which means that the N-channel MOSFET switch 113 can turn on at a lower voltage and start leakage with the reverse current up to 10 mA/Zener through the Zener diode. Although this configuration may solve certification problems, it will not meet performance requirements.

In FIG. 2, the electrical circuit 100 exhibits a slight deviation from the configuration shown in FIG. 1, featuring the prior art shunt protection circuit 102 equipped with a pair of Zener diodes 111 alongside an N-channel MOSFET switch 113, set with a gate threshold of nominal 3.9V in series, meeting the super cap voltage rating but with reduced reverse leakage current, however, the gate thresholds of the N-channel MOSFET switch 113 may potentially lead to activation at lower voltages and subsequent leakage currents up to 10 mA/Zener through the Zener diode, which, although addressing some certification concerns, falls short of meeting performance standards.

FIG. 3 illustrates a schematic diagram of the electrical circuit 100 with the prior art shunt protection circuit 102 based on a series protection configuration using a triplet of three Schottky diodes 117 in association with diodes 114 and 116. The configuration of the prior art shunt protection circuit 102 includes a series protection arrangement that uses the three Schottky diodes 117 between a boost output and the energy storage device (capacitor 110) to drop the voltage from 5.6V to 4.1V but requires two more diodes in series to make it total of 5 (the three diodes 117 and the diodes 114 and 116) as they apply two countable faults for Zone 0. This approach may meet certification requirement but introduces a great deal of forward voltage drop at the booster output, which in turn leads to performance issues. Furthermore, a diode forward drop is a function of temperature and increases exponentially with high temperatures.

There is a clear need for an energy harvesting system that can broaden the scope of existing solutions while improving update rates and avoiding the problems with prior art solutions such as shown in FIG. 1, FIG. 2, and FIG. 3. Furthermore, existing solutions on the market, however, are bulky and heavy due to their energy harvesting methods. In addition, for retrofitting applications where size and weight matter, there is a crucial need for a solution that can boost the efficiency of energy harvesting while maintaining a compact form factor.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for improved energy harvesting systems, devices, and methods.

It is another aspect of the embodiments to provide for improved energy harvesting systems, devices, and methods that prevent energy storing sources from overcharging.

It is also an aspect of the embodiments to provide for improved energy harvesting systems, devices, and methods that meet energy storing source over voltage protection and functional performance requirements.

It is a further aspect of the embodiments to provide for intrinsically safe energy harvesters for powering multi-sensor applications.

Is yet another aspect of the embodiments to provide for an improved electrical circuit that can protect an electronic device through the implementation of shunt protection circuitry.

It is also an aspect of the embodiments to provide for an electrical circuit and associated electronic components and devices that can facilitate the use of a shunt protection circuit that can meet functional requirements while exhibiting a very low reverse leakage current.

The aforementioned aspects and other objectives can now be achieved as described herein. In an embodiment, an electrical circuit for protecting an electronic device, can include a protection circuit comprising a plurality of diodes and at least one field effect transistor. An energy storage device is associated with the electronic device, and the field effect transistor is electrically connected to the plurality of diodes. A reference voltage of the protection circuit is tunable to trigger the protection circuit at a threshold voltage, which when triggered activates the at least one field effect transistor to protect the energy storage device from an over voltage condition or an over charging condition until the over voltage condition or the overcharging condition is no longer present.

In an embodiment of the electrical circuit, the protection circuit can protect the energy storage device and enhance the performance and the life of the electronic device by maintaining a low reverse leakage current consumption.

In an embodiment of the electrical circuit, the protection circuit can comprise a shunt regulator circuit.

In an embodiment of the electrical circuit, the plurality of diodes can include a triplet of diodes, shunt regulators and MOSFET switches for Zone 0/Class I Division 1 deployments in hazardous location (HAZLOC) areas.

In an embodiment of the electrical circuit, the plurality of diodes can comprise a duplet of diodes, shunt regulators and MOSFET switches for Zone 1/Class I Division 1 deployments in HAZLOC areas.

In an embodiment of the electrical circuit, the plurality of diodes can comprise a single set of diodes, shunt regulators and MOSFET switches for Zone 2/Class I Division 2 deployments in HAZLOC areas.

In an embodiment of the electrical circuit, the electronic device can comprise an energy harvesting device.

In an embodiment of the electrical circuit, the field effect transistor may be a MOSFET.

In an embodiment of the electrical circuit, the protection circuit can include a semiconductor switch comprising one or more of: a MOSFET, a PNP/NPN transistor, or an electronically controlled load switch.

In an embodiment of the electrical circuit, the MOSFET may be a P-Channel MOSFET.

In an embodiment, a shunt protection circuit can include a diode configured to shunt excess voltage above a predetermined threshold; an energy storing device connected in parallel with the diode; and a triplet circuit situated between the diode and the energy storing device, the triplet circuit comprising a semiconductor switch and a shunt regulator with a reference voltage set to activate the regulator at a predetermined threshold voltage, wherein the shunt regulator conducts when the voltage across the diode reaches the predetermined threshold voltage, thereby activating the semiconductor switch to protect the energy storing device.

In an embodiment of the shunt protection circuit, the shunt regulator can maintain a low reverse leakage current in the order of tens of microamps when not triggered.

In an embodiment of the shunt protection circuit, the overall system leakage current can be maintained below, for example, 10 microamps, thereby minimizing drainage of the energy storing device and meeting performance requirements of an end application.

In an embodiment of the shunt protection circuit, the semiconductor switch can comprise one or more of: a MOSFET, a PNP/NPN transistor, or an electronically controlled load switch.

In an embodiment of the shunt protection circuit, the MOSFET may be a P-Channel MOSFET.

In an embodiment, a method of protecting an electronic device can involve: electronically connecting a protection circuit to an electronic device, wherein the protection circuit includes a plurality of diodes and at least one field effect transistor, wherein the field effect transistor is electrically connected to the plurality of diodes; and tuning a reference voltage associated with the protection circuit to trigger the protection circuit at a threshold voltage, which when triggered activates the at least one field effect transistor to protect an energy storage device associated with the electronic device from an over voltage condition or an over charging condition until the over voltage condition or the overcharging condition is no longer present In an embodiment of the method, the protection circuit can protect the energy storage device and enhance the performance and life of the electronic device by maintaining a low reverse leakage current consumption.

In an embodiment of the method, the plurality of diodes can comprise a triplet of diodes, shunt regulators and MOSFET switches for Zone 0/Class I Division 1 deployments in hazardous location (HAZLOC) areas.

In an embodiment of the method, the plurality of diodes can comprise a duplet of diodes, shunt regulators and MOSFET switches for Zone 1/Class I Division 1 deployments in HAZLOC areas.

In an embodiment of the method, the plurality of diodes can comprise a single set of diodes, shunt regulators and MOSFET switches for Zone 2/Class I Division 2 deployments in HAZLOC areas.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figure 1:
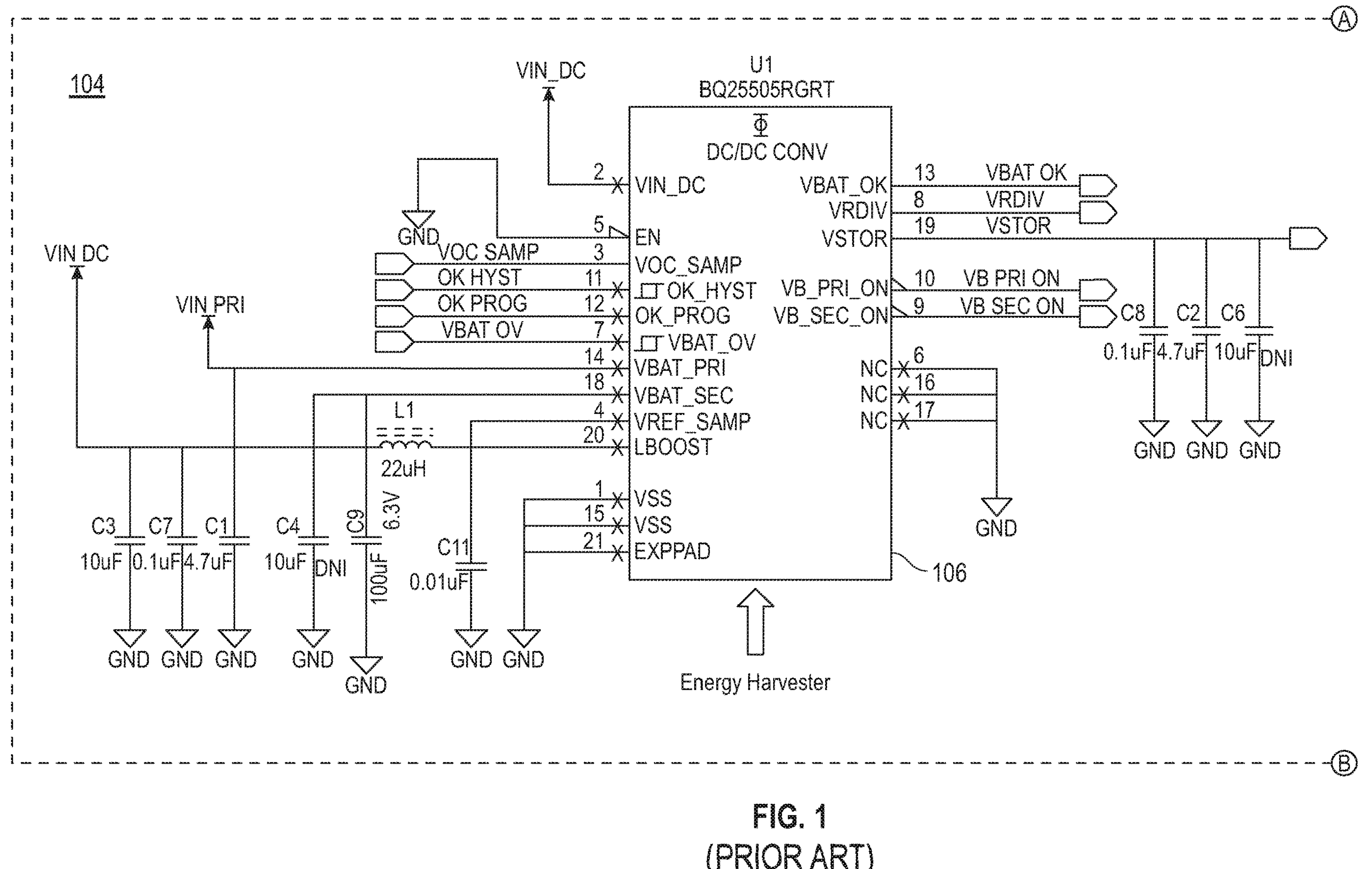
FIG. 1 illustrates a schematic diagram of a prior art shunt protection circuit using a duplet of Zener diodes.
Figure 2:
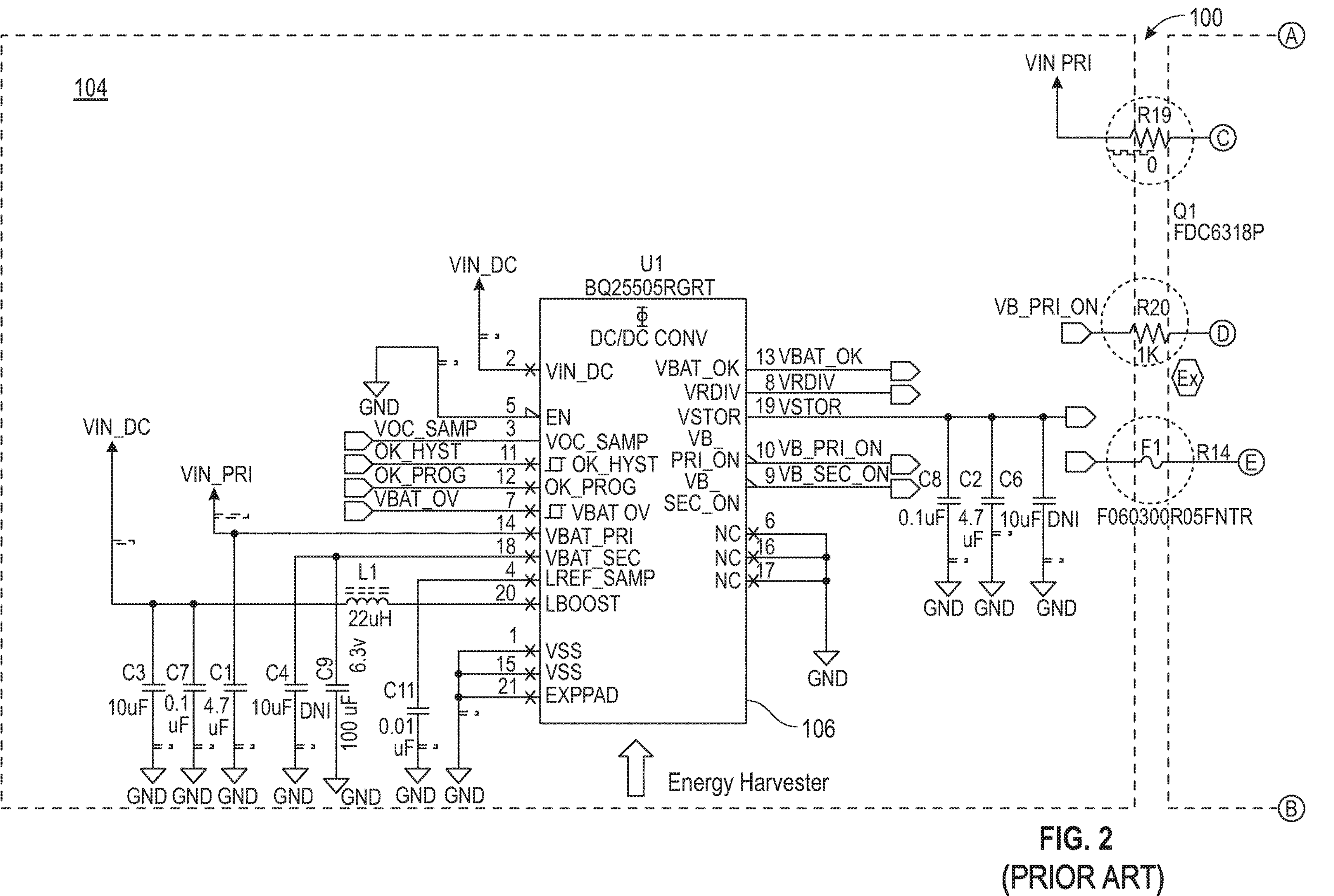
FIG. 2 illustrates a schematic diagram of a prior art shunt protection circuit using a duplet of Zener diodes with a MOSFET switch.
Figure 3:
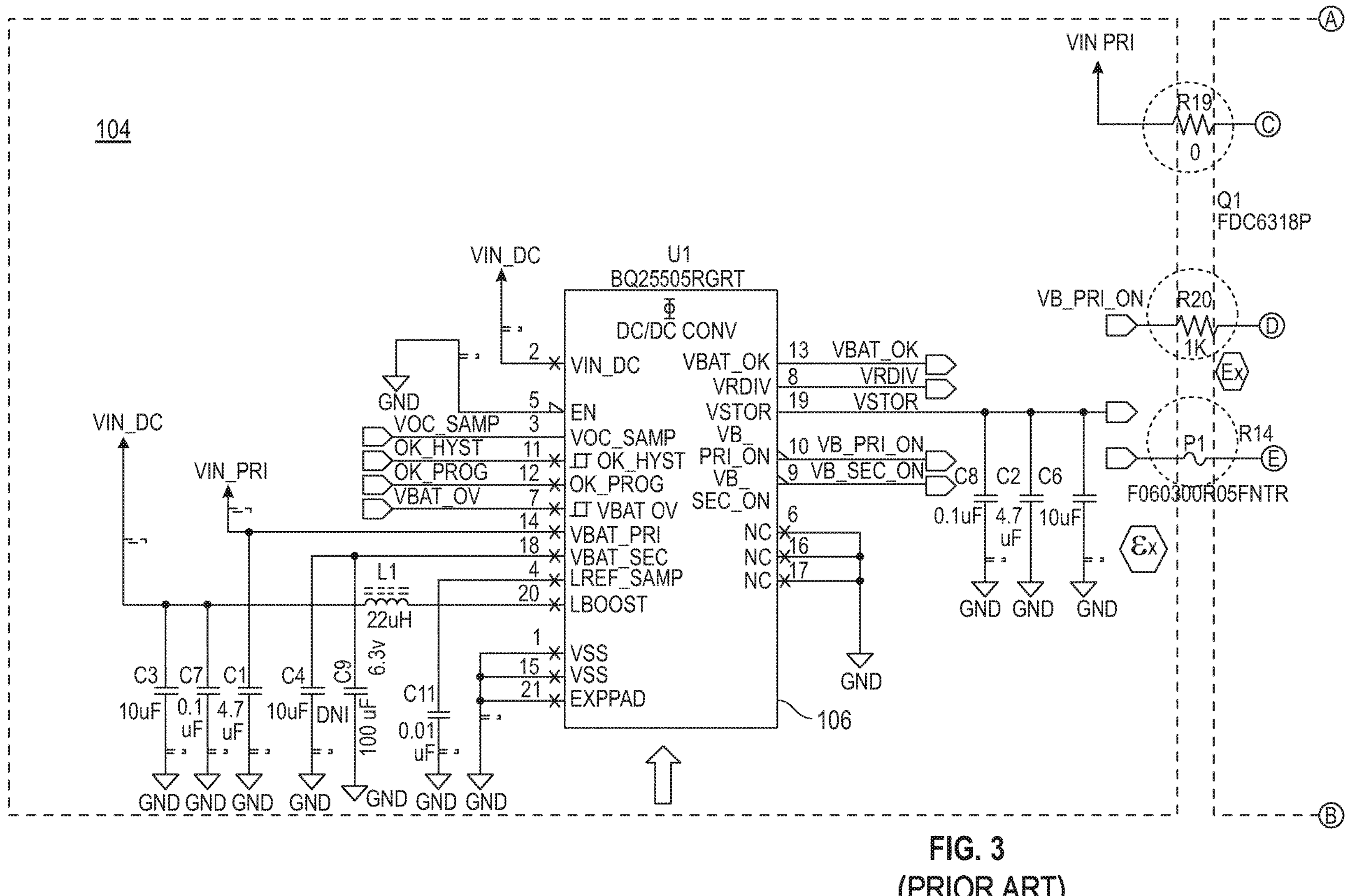
FIG. 3 illustrates a schematic diagram of a protection circuit based on a series protection configuration using a triplet of three Schottky diodes.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the terms "one or more" or "at least one" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets".

The terms "energy harvesting module," "energy harvesting device," "energy harvesting system" and "energy harvester" may be used interchangeably with one another, but in some situations may offer subtle differences in meaning depending on the context in which they are used. Before proceeding to a description of the embodiments, a breakdown of each term is outlined below.

The term "energy harvesting module" can relate to a discrete component or subsystem within a larger system that can be specifically designed to capture, convert, and store ambient energy from the environment. An energy harvesting module can include components such as energy harvesting transducers (e.g., photovoltaic cells, thermoelectric generators, piezoelectric materials), power management circuits, energy storage elements (e.g., supercapacitors, batteries), and possibly control or monitoring circuitry. The energy harvesting module may be integrated into a larger electronic system or device to supplement or replace traditional power sources, enabling self-sustainability or extended operation without external power input.

The term "energy harvesting device" can be used interchangeably with "energy harvesting module" in some contexts, referring to a device or component that can be designed for harvesting ambient energy. The term may also refer to a standalone device that can incorporate energy harvesting capabilities as its primary function, such as a solar-powered calculator or a self-powered sensor node. In some cases, "energy harvesting device" can emphasize the functionality of harvesting energy rather than the specific components or subsystems involved.

The term "energy harvester" can relate to a core component or subsystem responsible for capturing and converting ambient energy into usable electrical power. It may encompass the entire energy harvesting module or device, including all associated components and subsystems, or it may specifically refer to the transducer or mechanism responsible for energy conversion (e.g., a solar panel, a piezoelectric material, a thermoelectric generator). The term "energy harvester" may also be used to emphasize the action of harvesting energy rather than the complete system or device.

While there may be slight nuances in usage, these terms generally can refer to components or systems involved in the process of capturing, converting, and storing ambient energy for powering electronic devices. The choice of terminology may vary based on the specific context, emphasis on certain aspects of the technology, or conventions within a particular industry or field.

As will be discussed in greater detail below, the embodiments relate to an electrical circuit and associated electronic components and devices that can facilitate the utilization of a Zener shunt protection circuit, such as a 5.6V Zener shunt protection circuit, which can meet functional requirements while exhibiting very low reverse leakage current, on the order of around 5 uA.

A triplet circuit can be integrated between the Zener and an energy storing device, incorporating a shunt regulator circuit with a P-Channel MOSFET Switch. The reference of the shunt regulator can be set to activate the regulator at, for example, 3.9V. When the fault voltage reaches 3.9V, the shunt regulator can conduct, turning on the MOSFET switch to safeguard the Energy Storing Device. This action can ensure that the leakage current remains very low, in the range of, for example, a few tens of uA. The overall system leakage current, including the triplet circuit, can be kept under 10 uA. This design feature can prevent significant draining of the energy storing device, thereby contributing to meeting the performance requirements of the end application.

Figure 4:
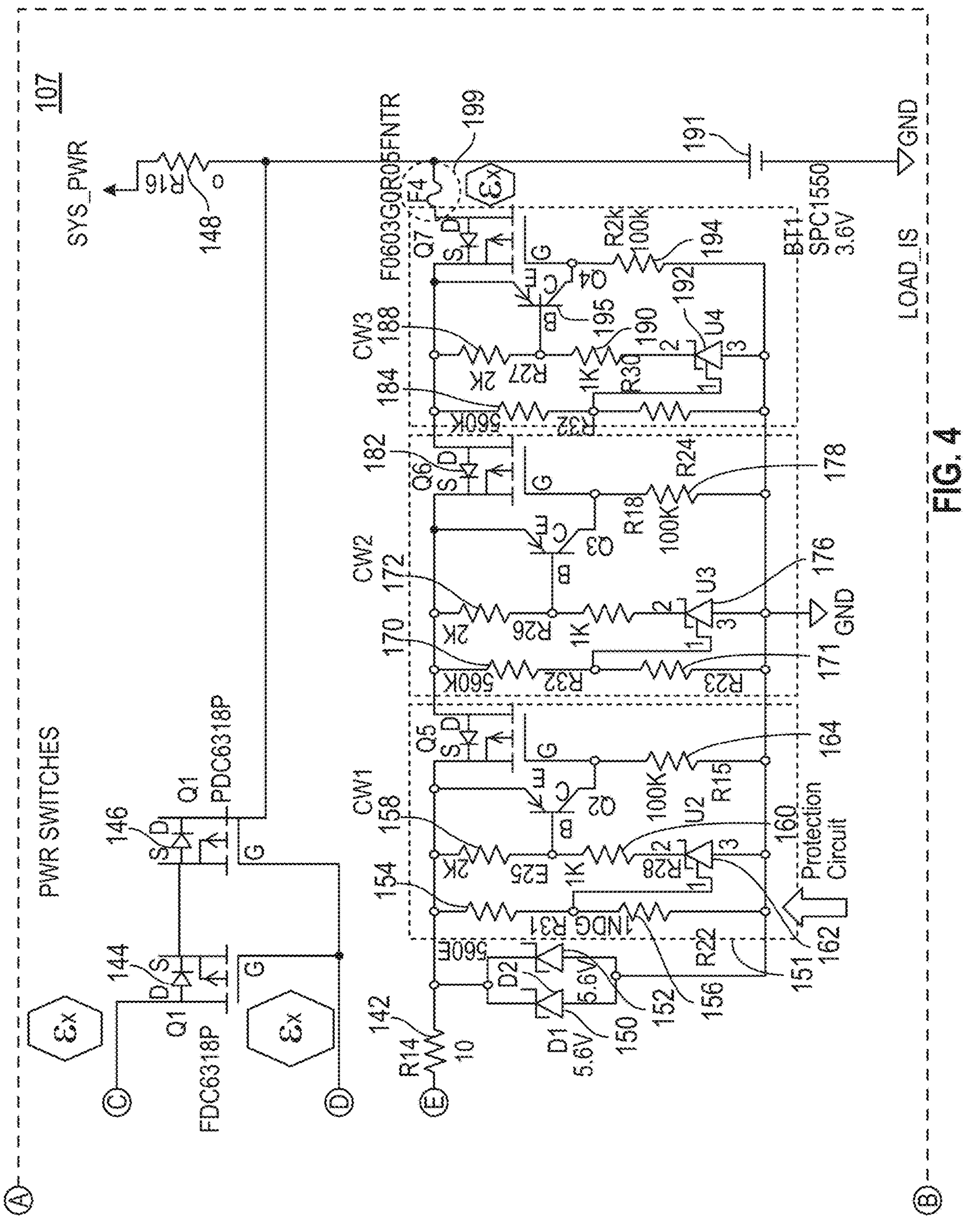
FIG. 4 illustrates a schematic diagram of an electrical circuit including an energy harvesting circuit and a protection circuit that includes a sub-circuit, which can incorporate the use of a shunt voltage regulator with a MOSFET switch, in accordance with an embodiment

FIG. 4 illustrates a schematic diagram of an electrical circuit 101 that includes an energy harvesting circuit 101 and a protection circuit 107 that can include a sub-circuit 151, which can incorporate a shunt voltage regulator with a MOSFET switch (e.g., P-Channel MOSFET), in accordance with an embodiment. The energy harvesting circuit 101 includes an energy harvester 109 and the protection circuit 107 can incorporate sub-circuits 151, 153, and 155 (also respectively labeled as CW1, CW2, and CW3) in FIG. 4.

As shown in FIG. 4, the energy harvester 109 can be electrically connected to a group of capacitors including capacitors 120, 122, 124, 126, 128 and capacitors 130, 132, and 134. The energy harvesting circuit 101 can connect to the protection circuit 107 through a switch 140 (also labeled as F1 in FIG. 4). The protection circuit 107 can include a group of switches (also labeled as PWR SWITCHES in FIG. 4) composed of diodes 144 and 146 and a resistor 138 that electrically connects to diode 144. A resistor 136 connects electrically to diode 144 and diode 146. A resistor 148 can connect electrically to the diode 146. Protection circuit 107 also includes a resistor 142 that can connect electrically to a diode 150 and a diode 152. In the electrical circuit 101 shown in FIG. 4, diodes 150 and 152 can be connected in parallel with one another.

The sub-circuit 151 can include a resistor 154 that can be connected electrically in series with a resistor 156. The sub-circuit 151 also can include a resistor 158 that can connect electrically to a resistor 160, which in turn can electrically connect to a diode 162. In addition, a P-Channel MOSFET 166 can connect electrically to the resistor 160 and the resistor 166, and to a resistor 164 and a diode 168.

The sub-circuit 153 can include a resistor 170 that can connect electrically to a resistor 171. A diode 176 can connect electrically to the resistor 170 and the resistor 171 and further to a resistor 174. A resistor 172 connects electrically to resistor 174 and a P-Channel MOSFET 180. The sub-circuit 153 additionally includes a diode 182 that connects to the P-Channel MOSFET 180 and to a resistor 178.

The sub-circuit 155 includes a resistor 184 that can connect electrically to a resistor 186. A diode 192 connects electrically to the resistor 184 and the resistor 186. A resistor 190 connects electrically to the output of diode 192 and to a resistor 188. A P-Channel MOSFET 195 connects electrically to a resistor 194 and a diode 198. The diode 198 in turn connects to a capacitor 196 through a switch 199.

Note that in FIG. 4, the shunt voltage regulator comprises components within sub-circuit 151 including the series of resistors 154, 156, 158, 160, the diode 162, and the P-Channel MOSFET 166. Additionally, within sub-circuit 153, the P-Channel MOSFET 180 can function as part of the shunt voltage regulator. These components can work together to regulate the voltage across the energy harvesting circuit 101 and ensure that it remains within a safe range, protecting it from overvoltage conditions.

Figure 5:
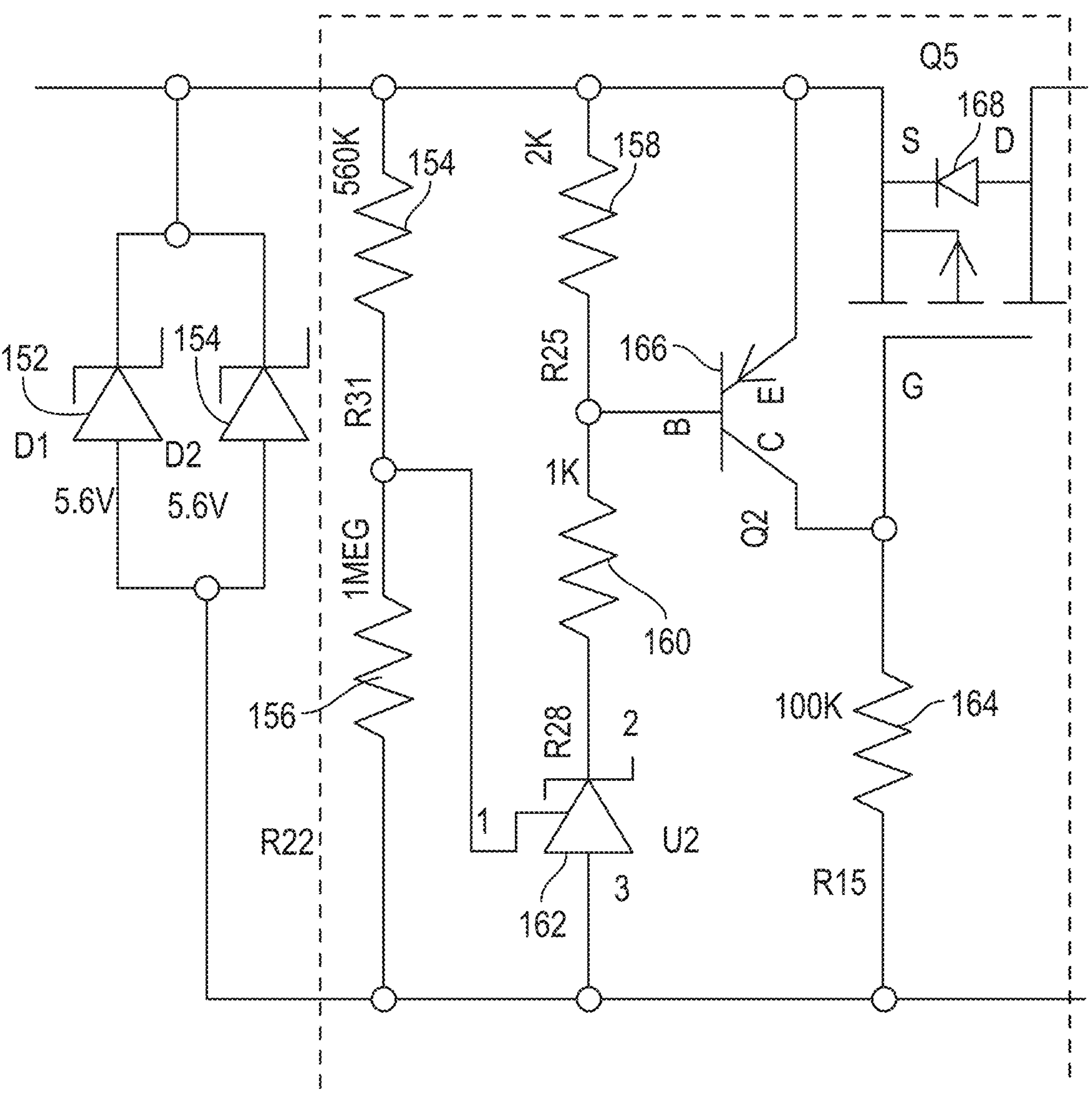
FIG. 5 illustrates a schematic diagram of a sub-circuit, which may be implemented in accordance with an embodiment.

FIG. 5 illustrates a schematic diagram of the sub-circuit 151, which may be implemented in accordance with an embodiment. As discussed above, the sub-circuit 151 can include two diodes 150 and 152, which are also labeled respectively as D1 and D2 in FIG. 5 and shown as electrically connected in parallel with one another. The diodes 150 and 152 can electrically connect to a resistor 154 and to a resistor 156. The resistor 154 and the resistor 156 can be connected in series with one another and can connect electrically to a diode 162. The resistor 160 can connect electrically to the diode 162 and to a resistor 158 and can further connect electrically to P-Channel MOSFET 166. The resistor 158 and the P-Channel MOSFET transistor 166 can electrically connect to diode 168. The P-Channel MOSFET 166 further can connect electrically to a resistor 164.

The approach can streamline the use of a 5.6V Zener shunt protection circuit, with a low reverse leakage current of approximately 5 uA, effectively meeting functional requirements. To bolster protection, a triplet of shunt regulator circuits (sub-circuits 151, 153, 155), each incorporating a P-Channel MOSFET switch, can be introduced between the Zener and the energy storing device. The shunt regulator's reference is finely tuned to trigger at 3.9V, ensuring timely activation. Upon reaching this threshold, the shunt regulator initiates, promptly deactivating the MOSFET switch to shield the energy storing device from harm.

Prior to activation, the system maintains minimal reverse leakage current, typically in the range of a few 10s of uA. With the addition of the triplet circuit, the overall system leakage current remains below 10 uA, effectively safeguarding the energy Storing device and maintaining optimal performance for the end application. Note that the term 'Zener' as utilized herein relates to a Zener diode, which is a silicon pn junction device that allows current to flow not only in the forward direction like a typical silicon or germanium diode, but also in the reverse direction if the voltage is greater than the breakdown voltage known as Zener knee voltage or simply Zener voltage (named after Clarence Melvin Zener, the discoverer of this electrical property).

Figure 6A:
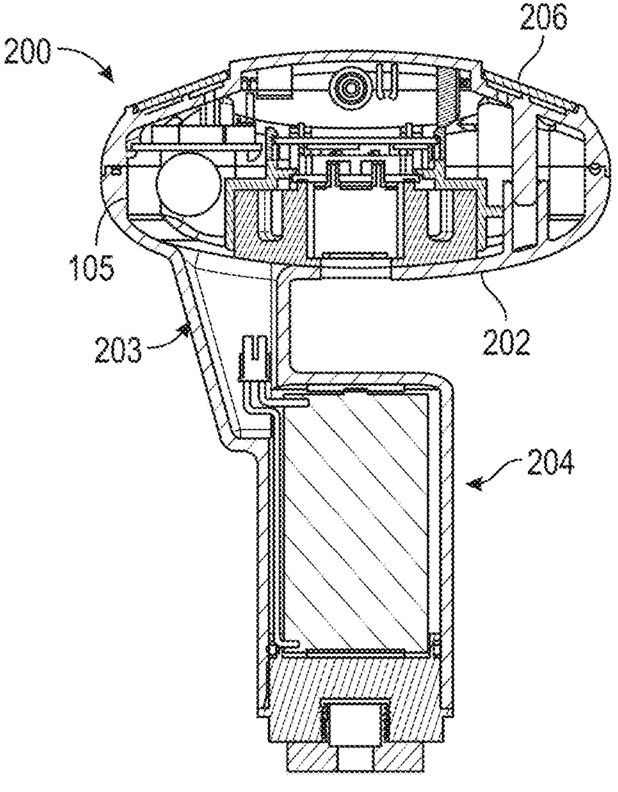
FIG. 6A and FIG. 6B illustrate respective cut-away side and perspective views of an application circuit that can be implemented in the context of a signal scout gas detector system, in accordance with an embodiment.
Figure 6B:
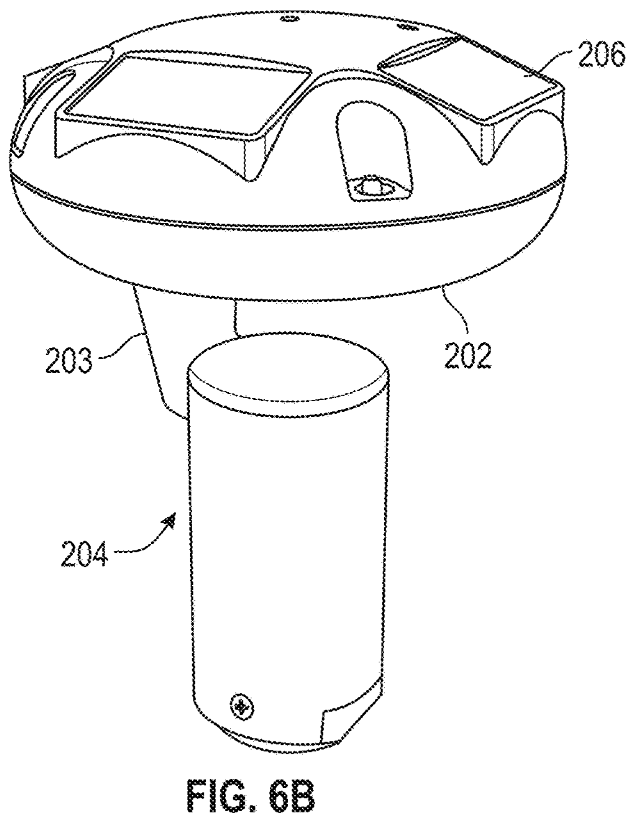

FIG. 6A and FIG. 6B illustrate respective cut-away side and perspective views of an application circuit 105 that can be implemented within a signal scout system 200, in accordance with an embodiment. Note that the signal scout system 200 can include an upper portion 202, a middle portion 203, and a lower portion 204. One or more photovoltaic cells such as photovoltaic cell 206 may be positioned on top of the upper portion 202 of the signal scout system 200.

In FIG. 6A, the application circuit 105 is shown a located within the upper portion 102. The application circuit 105 may be implemented as an energy harvester PWA (Printed Wiring Assembly) with an super capacitor. The energy harvester PWA may be implemented as a circuit board assembly that can harvest and store energy from ambient sources, such as light, heat, or vibration, using a super capacitor as an energy storage device. Note than an example of a device, which can be utilized to implement the signal scout system 200, is disclosed in the document "Honeywell Versatilis™ Signal Scout™ Release 100, Installation and User's Guide, 34-VT-25-02, February 2023," which is incorporated herein by reference in its entirety.

The signal scout system 200 can be implemented with an energy harvesting module that can generate up to 100 mW of power with a sunlight of 50K Lux and a minimum of 30 mW with 10K Lux. The Honeywell Versatilis™ Signal Scout™ can be equipped with a D-Cell Battery having a battery life of 4 months in continuous operation mode and 1.5 years in 25% duty cycle mode with 5 sec sensor sampling and 2 min LoRa publish rate. The addition of the disclosed energy harvesting solution can enhance the battery life up to 7-10 years depending on geography it deployed if the unit receives at least 4 hrs sunlight.

Note that the acronym "PWA" stands for "Printed Wiring Assembly," which relates to a circuit board populated with electronic components and wiring to perform a specific function. In the context of an energy harvester, the PWA can contain components such as energy harvesting circuitry, a super capacitor, voltage regulation components, and additional circuitry for monitoring and managing the harvested energy.

Figure 7A:
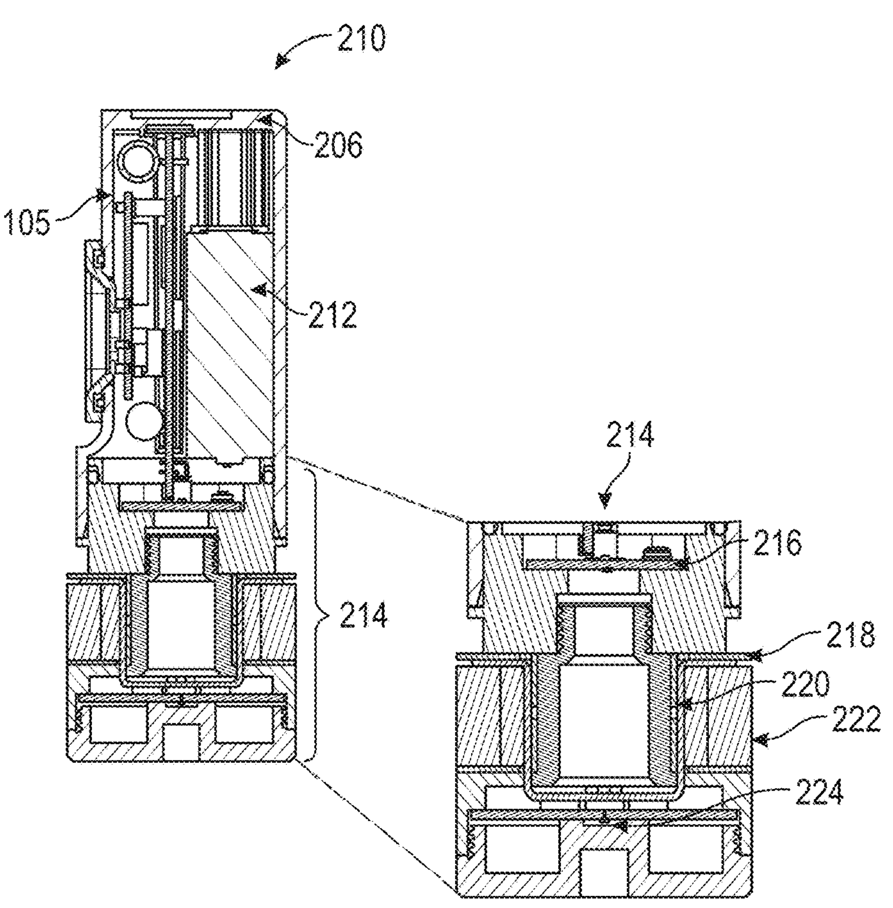
FIG. 7A and FIG. 7B illustrate respective cut-away side and perspective views of an application circuit, which can be implemented in a multi-variant transmitter system, in accordance with an embodiment.
Figure 7B:
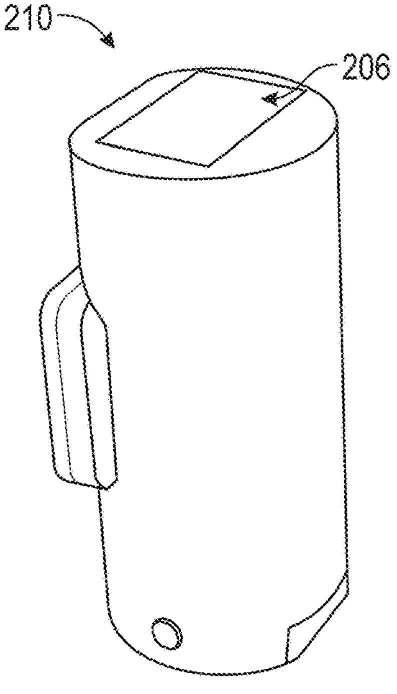

FIG. 7A and FIG. 7B illustrate respective cut-away side and perspective views of an application circuit 105, which can be implemented in a transmitter system 210, in accordance with an embodiment. As shown in FIG. 7A, the transmitter system 210 can include the application circuit 105. As discussed above, the application circuit 105 can function as an energy harvester PWA with a super capacitor 212 (e.g., super capacitor/battery). A photovoltaic cell 206 may be located at the top of the transmitter system 210. A lower portion 214 of the transmitter system 210 can include an interface board 216 along with a thermal isolator 218, a PCM heat exchanger 220, a heat sink 222, and a temperature sensor 224. FIG. 7B shows a pictorial perspective view of the transmitter system 210.

Note that a non-limiting example of a device, which can be adapted for use as or with the transmitter system 210 is shown and described in the document, "Honeywell Versatilis Transmitter, Multi-Variant Sensing, 34-VT-03-01|Rev 6|June 2023," which is incorporated herein by reference in its entirety."

The embodiments can be tailored to meet specific requirements, including, for example, HAZLOC approval, wherein the energy harvesting solution can be designed to support deployment in hazardous locations, meeting standards such as IECEx Zone0 and Class I Division 1. Other specific requirements may include size and power. For example, the embodiments can be implemented in a compact design and can integrate energy harvesting capabilities with sensors, communication, and processing functionalities into a single device. Embodiments can also feature a highly efficient and ultra-low leakage energy harvesting system capable of extracting power ranging from microwatts (μW) to milliwatts (mW) from various DC energy sources, including photovoltaic (solar) and thermoelectric generators (TEG), without disrupting their operations.

Figure 8A:
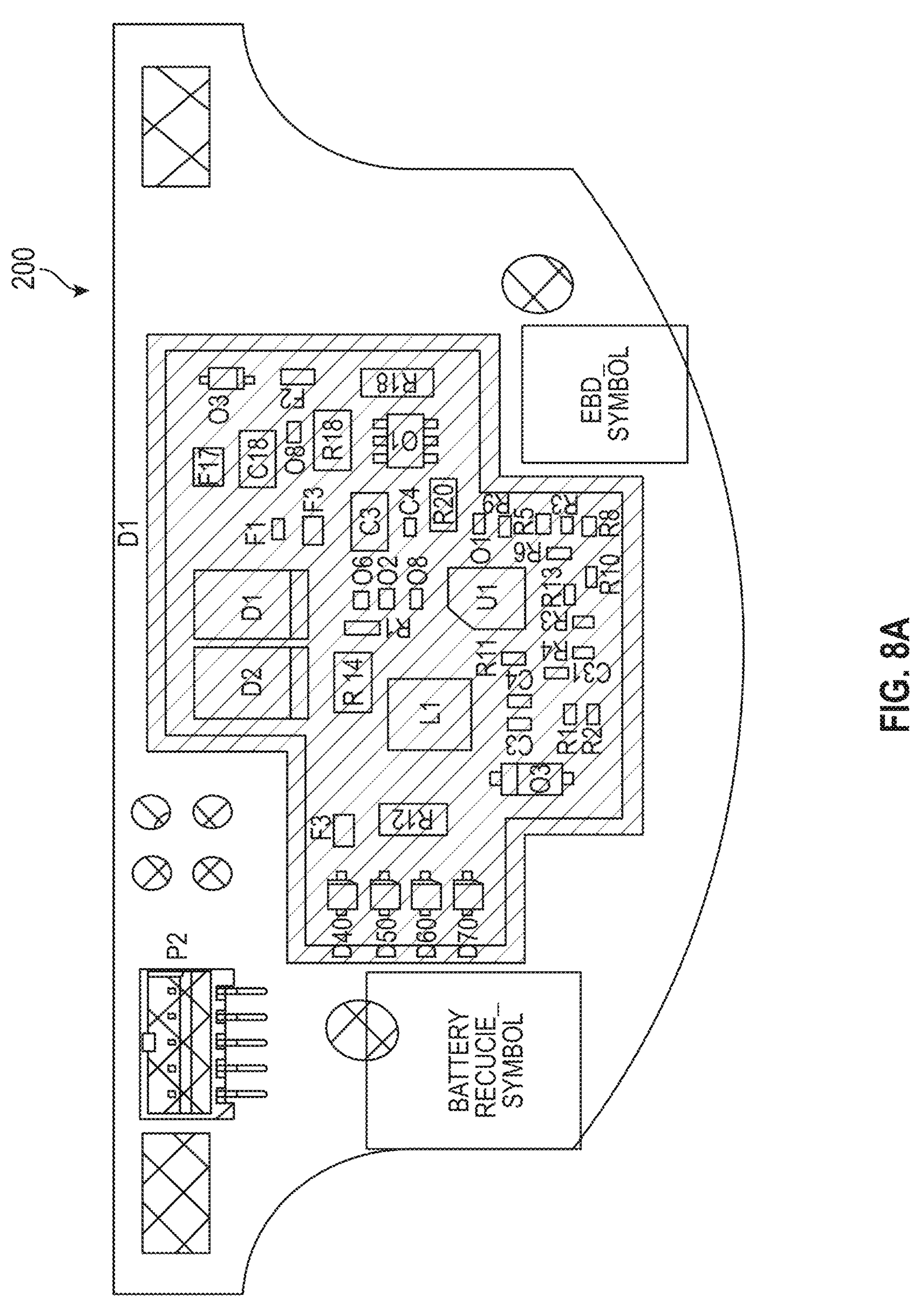
FIG. 8A and FIG. 8B illustrate layout diagrams of a signal scout energy harvester incorporating a shunt protection circuit and a super capacitor, in accordance with an embodiment.
Figure 8B:
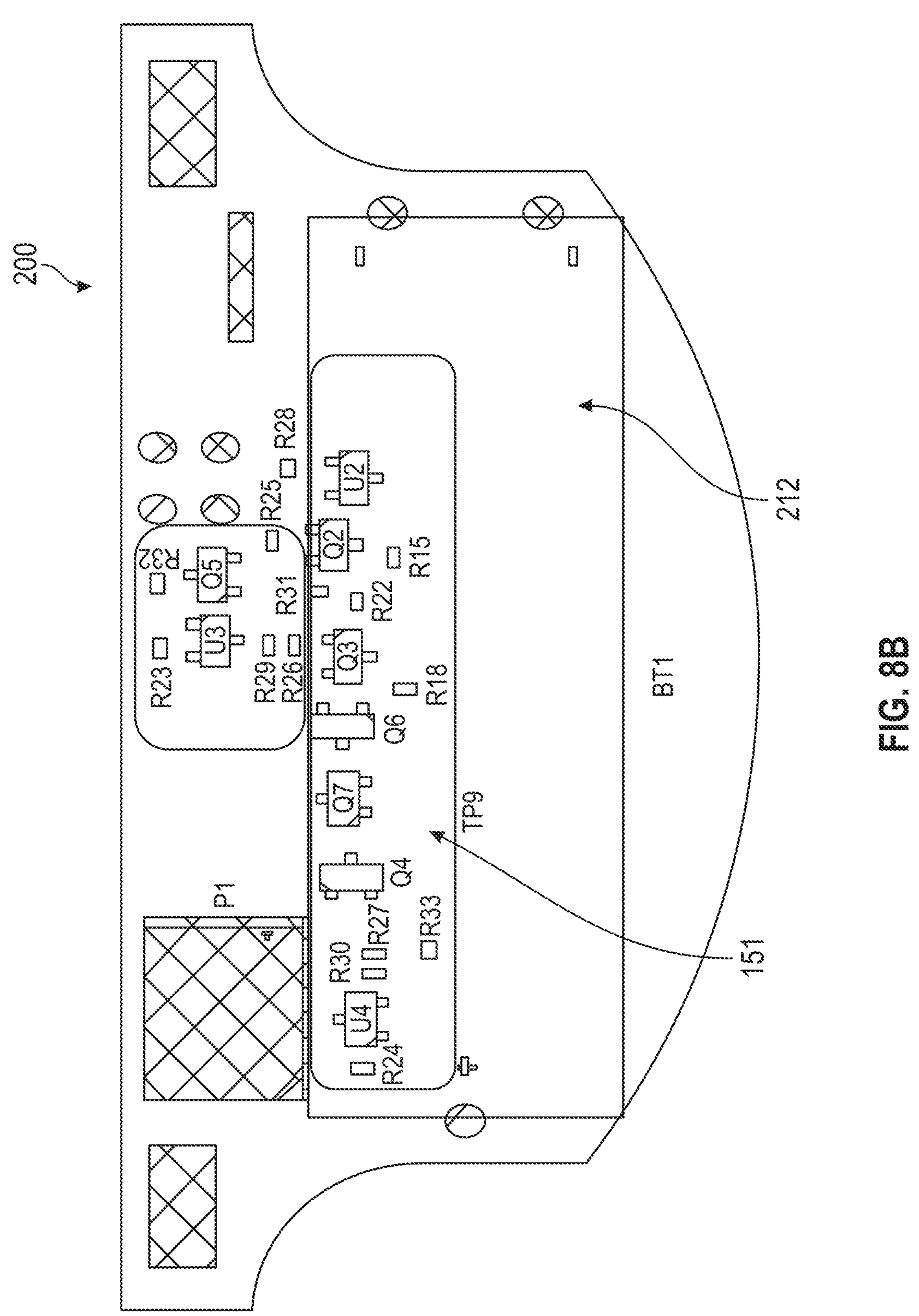

FIG. 8A and FIG. 8B illustrate layout diagrams of the signal scout system 200 shown in FIG. 6A and FIG. 6B, in accordance with an embodiment. The signal scout system 200 can function as a signal scout energy harvester and can incorporate the shunt protection sub-circuit 151 and super capacitor 212. The signal scout system 200 can serve a dual role as both a signal scout and an energy harvester. The signal scout system 200 can incorporate essential components such as the shunt protection sub-circuit 151 and the super capacitor 212. The layout diagrams shown in FIG. 8A and FIG. 8B offer a comprehensive view of how these components are arranged within the system, highlighting their spatial relationships and connections. This design ensures optimal functionality and efficiency for the signal scout system, enabling it to effectively harvest energy while performing its scouting duties.

Figure 9A:
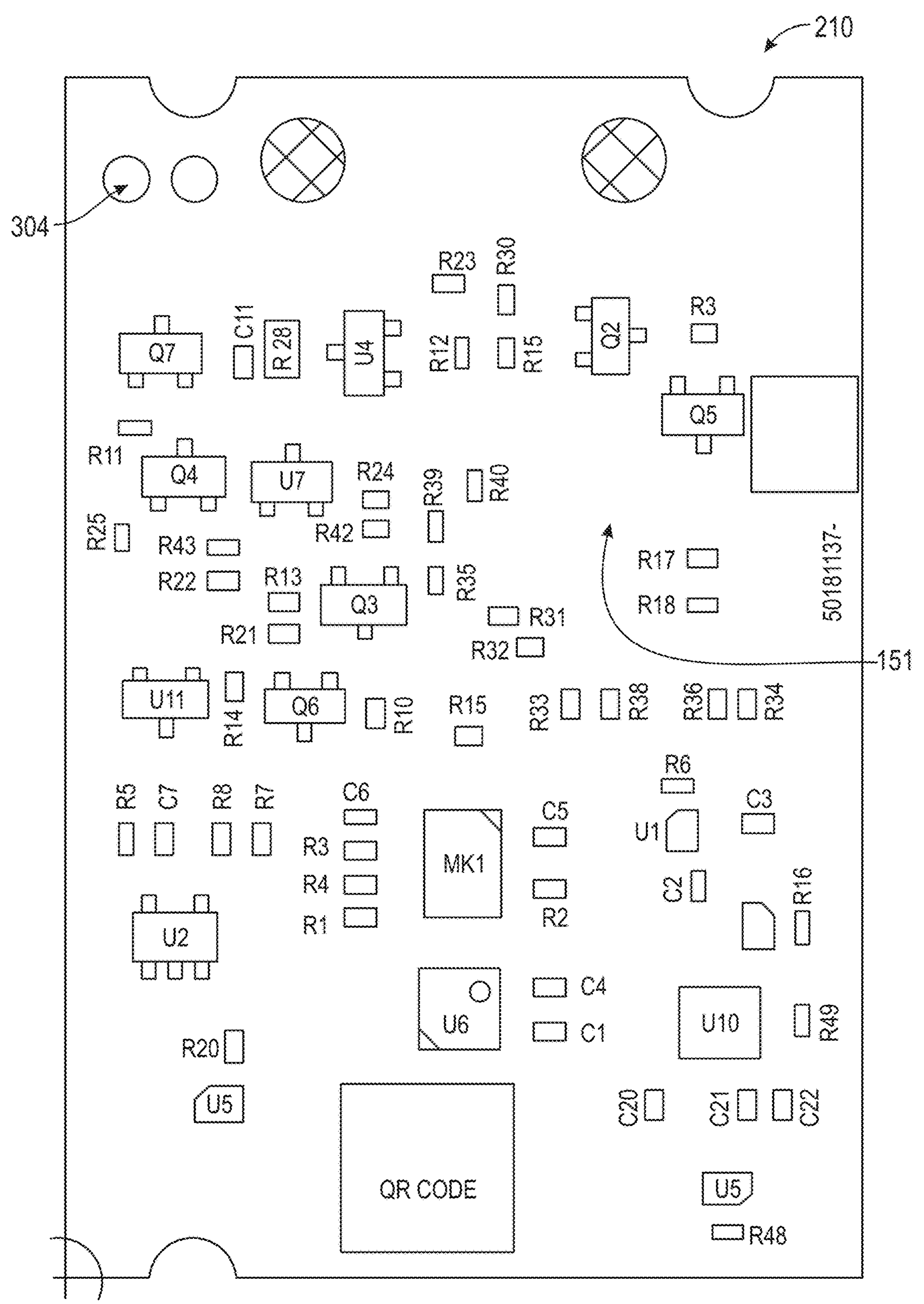
FIG. 9A and FIG. 9B illustrate layout diagrams of a transmitter energy harvester, which may be implemented in accordance with an embodiment.
Figure 9B:
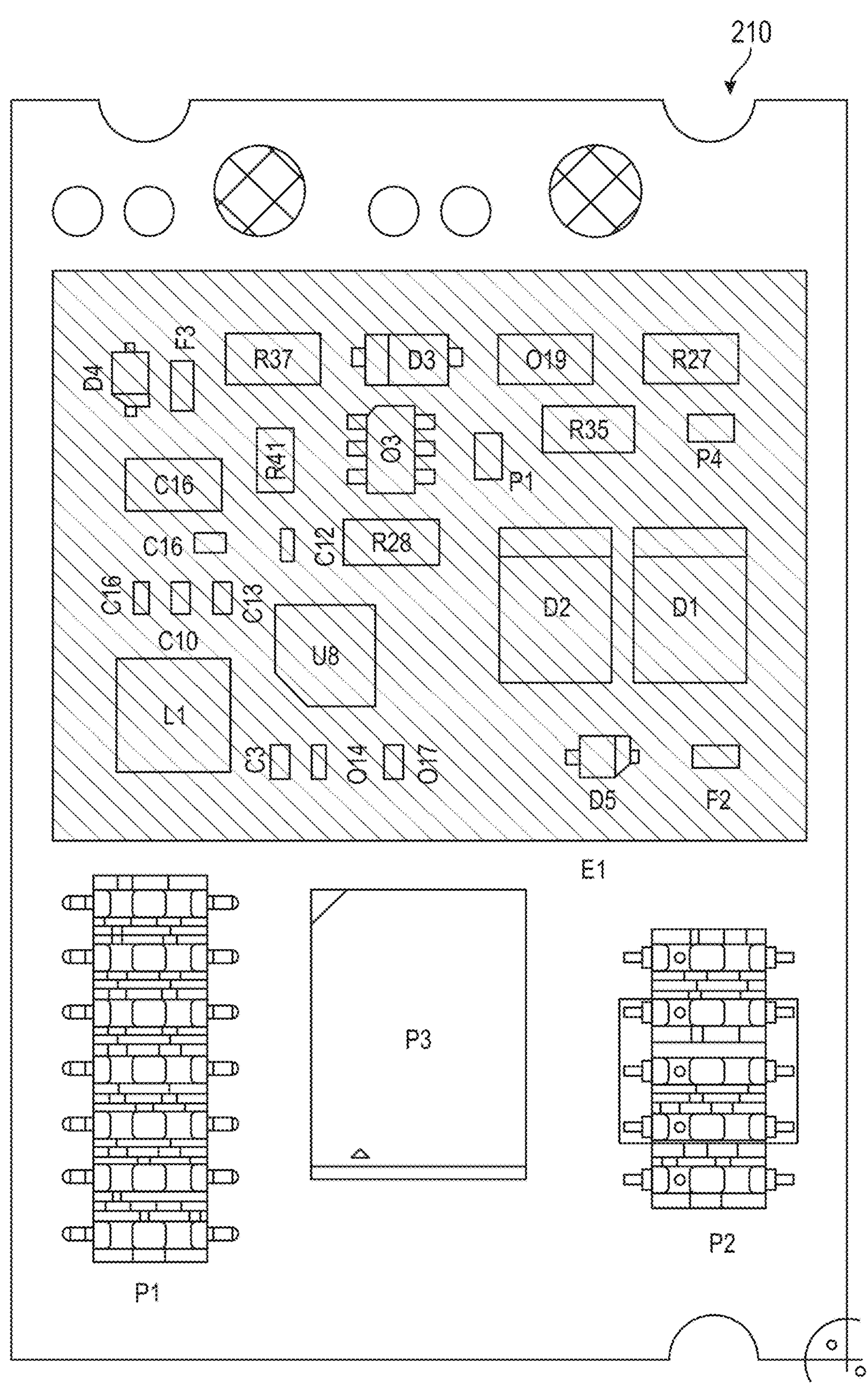

FIG. 9A and FIG. 9B illustrate layout diagrams of the transmitter system 210 shown in FIG. 7A and FIG. 7B, in accordance with an embodiment. The transmitter system 210 can function as a transmitter energy harvester as discussed previously. As shown in FIG. 9A, a super capacitor connection 304 is shown along with a shunt protection sub-circuit 151.

It can be appreciated that the embodiments offer a number of advantages and features. For example, by incorporating the shunt voltage regulator with MOSFET switches (P-Channel MOSFET) in the protection circuit, the embodiments can provide robust protection against overvoltage conditions. The sub-circuit 151, along with sub-circuits 153 and 155, for example, can effectively regulate the voltage across the energy harvesting circuit, thereby ensuring it remains within a safe range, while safeguarding it from potential damage due to voltage spikes or surges. Furthermore, the integration of the protection circuit with the energy harvesting module can ensure efficient energy utilization. By maintaining the voltage within a specified range, the invention can maximize the energy harvesting capabilities of the system, allowing it to effectively capture and store energy from ambient sources such as light, heat, or vibration.

The disclosed energy harvesting solution also significantly extends the battery life of devices such as the signal scout system and transmitter system. By supplementing the primary power source (e.g., D-cell battery) with harvested energy, the invention can prolong the operational lifespan of these devices, reducing the frequency of battery replacements and maintenance requirements. In addition, the embodiments can be tailored to meet specific requirements, including hazardous location (HAZLOC) approvals and standards such as IECEx Zone0 and Class I Division 1. Additionally, the compact design and integration capabilities enable the invention to meet size, power, and efficiency demands across various applications, ensuring compliance with industry standards and regulations.

The signal scout system and transmitter system, equipped with the disclosed energy harvesting solution, serve a dual role, functioning both as scouts or transmitters and as energy harvesters. This versatility enhances the overall utility and value proposition of the systems, allowing them to perform their primary functions while simultaneously harnessing ambient energy for sustained operation.

Overall, the embodiments offer a comprehensive solution for efficient energy management and protection in electronic devices, enabling prolonged operation, enhanced reliability, and compliance with industry standards.

It should be appreciated that although the operations of the devices, systems and/or method(s) herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the steps or operations described or features herein can be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented in hardware or in an implementation containing hardware and software elements. In embodiments that do utilize software, the software may include firmware, resident software, microcode, etc.

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that the blocks of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, it can be appreciated that a number of varying embodiments are disclosed herein. For example, in an embodiment an electrical circuit for protecting an electronic device, can include a protection circuit for an electronic device, wherein the protection circuit includes a plurality of diodes and at least one field effect transistor; and an energy storage device associated with the electronic device, wherein the field effect transistor is electrically connected to the plurality of diodes, wherein a reference voltage of the protection circuit is tunable to trigger the protection circuit at a threshold voltage, which when triggered activates the at least one field effect transistor to protect the energy storage device from an over voltage condition or an over charging condition until the over voltage condition or the overcharging condition is no longer present.

In an embodiment, the protection circuit can protect the energy storage device and can enhance the performance and life of the electronic device by maintaining a low reverse leakage current consumption.

In an embodiment, the protection circuit can include a shunt regulator circuit.

In an embodiment, the plurality of diodes can comprise, for example, a triplet of diodes, shunt regulators and MOSFET switches for Zone 0/Class I Division 1 deployments in hazardous location (HAZLOC) areas.

In an embodiment, the plurality of diodes can comprise, for example, a duplet of diodes, shunt regulators and MOSFET switches for Zone 1/Class I Division 1 deployments in HAZLOC areas.

In an embodiment, the plurality of diodes can comprise, for example, a single set of diodes, shunt regulators and MOSFET switches for Zone 2/Class I Division 2 deployments in HAZLOC areas.

In an embodiment, the electronic device can be an energy harvesting device.

In an embodiment, the field effect transistor can comprise a MOSFET.

In an embodiment, the protection circuit can comprise a semiconductor switch including one or more of, for example: a MOSFET, a PNP/NPN transistor, or an electronically controlled load switch.

In an embodiment, the MOSFET can comprise a P-Channel MOSFET.

In an embodiment, a shunt protection circuit can include: a diode configured to shunt excess voltage above a predetermined threshold; an energy storing device connected in parallel with the diode; and a triplet circuit situated between the diode and the energy storing device, the triplet circuit comprising a semiconductor switch and a shunt regulator with a reference voltage set to activate the regulator at a predetermined threshold voltage, wherein the shunt regulator can conduct when the voltage across the diode reaches the predetermined threshold voltage, thereby activating the semiconductor switch to protect the energy storing device.

In an embodiment of the shunt protection circuit, the shunt regulator can maintain a low reverse leakage current in the order of, for example, tens of microamps, when not triggered.

In an embodiment of the shunt protection circuit, the overall system leakage current can be maintained below, for example, 10 microamps, thereby minimizing drainage of the energy storing device and meeting performance requirements of the end application.

In an embodiment of the shunt protection circuit, the semiconductor switch can comprise one or more of: a MOSFET, a PNP/NPN transistor, or an electronically controlled load switch.

In an embodiment of the shunt protection circuit, the MOSFET can comprise a P-Channel MOSFET.

In an embodiment, a method of protecting an electronic device, can involve: electronically connecting a protection circuit to an electronic device, wherein the protection circuit includes a plurality of diodes and at least one field effect transistor, wherein the field effect transistor is electrically connected to the plurality of diodes; and tuning a reference voltage associated with the protection circuit to trigger the protection circuit at a threshold voltage, which when triggered activates the at least one field effect transistor to protect an energy storage device associated with the electronic device from an over voltage condition or an over charging condition until the over voltage condition or the overcharging condition is no longer present In an embodiment of the method, the protection circuit can protect the energy storage device and can enhance the performance and life of the electronic device by maintaining a low reverse leakage current consumption.

In an embodiment of the method, the plurality of diodes can comprise, for example, a triplet of diodes, shunt regulators and MOSFET switches for Zone 0/Class I Division 1 deployments in hazardous location (HAZLOC) areas.

In an embodiment of the method, the plurality of diodes can comprise, for example, a duplet of diodes, shunt regulators and MOSFET switches for Zone 1/Class I Division 1 deployments in HAZLOC areas.

In an embodiment of the method, the plurality of diodes can comprise, for example, a single set of diodes, shunt regulators and MOSFET switches for Zone 2/Class I Division 2 deployments in HAZLOC areas.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A shunt protection circuit, comprising:

a plurality of Zener diodes electrically connected in parallel and configured to shunt excess voltage above a predetermined threshold;

an energy storing device connected in parallel with the plurality of Zener diodes; and a plurality of circuits situated between the plurality of Zener diodes and the energy storing device, each circuit comprising a metal-oxide semiconductor field effect transistor (MOSFET) and a shunt regulator with a reference voltage set to activate the shunt regulator at a predetermined threshold voltage, wherein the shunt regulator of each circuit conducts when the voltage across the plurality of Zener diodes reaches the predetermined threshold voltage, thereby causing the MOSFET of each circuit to conduct and thereby protect the energy storing device, wherein the shunt protection circuit is deployable in Zone 0/Class I Division 1 hazardous location (HAZLOC) areas.

2. The shunt protection circuit of claim 1 wherein each shunt regulator maintains a low reverse leakage current in the order of tens of microamps when not triggered.

3. The shunt protection circuit of claim 1 wherein an overall system leakage current is maintained below 10 microamps, thereby minimizing drainage of the energy storing device and meeting performance requirements of an end application.

4. The electrical circuit of claim 1, wherein each MOSFET comprises a P-Channel MOSFET.

* * * * *